United States Patent [19]

Hazenbroek et al.

[11] Patent Number: 4,893,378
[45] Date of Patent: Jan. 16, 1990

[54] REVOVING POULTRY THIGH DEBONER

[75] Inventors: Jacobus E. Hazenbroek; Bastiaan Verrijp, both of Numansdorp, Netherlands

[73] Assignee: Systemate Holland B.V., Netherlands

[21] Appl. No.: 264,890

[22] Filed: Oct. 31, 1988

[51] Int. Cl.⁴ ............................................. A22C 25/16
[52] U.S. Cl. ...................................... 17/46; 17/1 G; 17/11
[58] Field of Search .................... 17/46, 50, 1 G, 11

[56] References Cited

U.S. PATENT DOCUMENTS

| | | | |
|---|---|---|---|
| 2,897,536 | 8/1959 | Bergstrom et al. | 17/1 R |
| 3,261,054 | 7/1966 | Kaplan et al. | 17/11 |
| 3,296,653 | 1/1967 | Segur | 17/11 |
| 3,348,261 | 10/1967 | Segur | 17/45 |
| 3,402,423 | 9/1968 | Helgeson et al. | 17/1 R |
| 3,456,284 | 7/1969 | Werner et al. | 17/1 R |
| 3,533,128 | 10/1970 | Brown et al. | 17/1 R |
| 3,672,000 | 6/1972 | Martin et al. | 17/11 |
| 3,866,271 | 2/1975 | McNeil | 17/1 G |
| 3,965,535 | 6/1976 | Kaplan et al. | 17/46 |
| 4,041,572 | 8/1977 | Martin et al. | 17/46 |
| 4,068,350 | 1/1978 | Van Appledorn | 17/1 G |
| 4,213,229 | 7/1980 | Helmer et al. | 17/46 |
| 4,216,565 | 8/1980 | Volk et al. | 17/1 G |
| 4,327,463 | 5/1982 | Martin | 17/11 |
| 4,377,884 | 3/1983 | Viscolosi | 17/11 |
| 4,402,112 | 9/1983 | Gasbarro | 17/11 |
| 4,446,600 | 5/1984 | Hooley et al. | 17/11 |
| 4,488,332 | 12/1984 | Atteck et al. | 17/46 |
| 4,495,675 | 1/1985 | Hill et al. | 17/46 |
| 4,577,369 | 3/1986 | Langen et al. | 17/46 |
| 4,669,150 | 6/1987 | Manmoto et al. | 17/1 G |
| 4,736,492 | 4/1988 | Hazenbrock et al. | 17/46 |

Primary Examiner—Willis Little
Attorney, Agent, or Firm—Thomas & Kennedy

[57] ABSTRACT

The deboner (10, 110) carries a plurality of modules (11, 111) in a closed path through a series of processing stations. Each module includes a rotary bone holder (30, 130) that supports one end of a poultry bone (85) and a stripper assembly (31, 131) that is moved toward and away from the bone holder. The stripper blades (55, 56, and 155, 156) engage the poultry part (86) as the stripper assembly is moved away from the bone holder to strip the meat (87) from the bone (85). As the blades (55, 56 and 155, 156) strip the meat from the bone, the rotary bone holder is rotated by its sprocket (36, 136) engaging the sprocket turning protrusions (45, 145).

16 Claims, 9 Drawing Sheets

REVOVING POULTRY THIGH DEBONER

FIELD OF THE INVENTION

This invention generally relates to a process and apparatus for removing meat from bones of fowl and animals, and in particular relates to a process and apparatus for deboning poultry thighs by moving the bone of the thigh longitudinally with respect to the meat and stripping the meat from the bone.

BACKGROUND OF THE INVENTION

When removing the meat of the poultry thigh from its bone, the usual procedure is to strip the meat from the bone by scraping with a tool along the length of the bone. For example, two or more blades having notches therein are moved into contact with the meat and the bone with the notches of the blades straddling the bone, and the bone is then pulled through the notched blades. This longitudinal movement of the bone with respect to the blades causes the blades to scrape the meat along the length of the bone and finally off the end of the bone. Usually, the meat remains in a single mass after the meat has been stripped from the bone. Examples of this stripping type of meat removal from a bone are found in U.S. Pat. Nos. 3,672,000, 4,327,463 and 4,495,675.

One advantage of removing the bone from the meat of an edible fowl is that when the meat is later cooked, the bone does not have to be cooked, which saves energy. Further, if the bone is separated before the cooking process, the bone can be conveniently saved and used as bone meal, etc.

A problem with some of the prior art poultry deboning equipment is that the blades that engage the bone and strip the meat from the bone sometime inadvertently cause bone fragments to be carried away from the bone in the meat.

Another problem with some of the prior art automated deboning equipment has been that the equipment must be manually loaded by placing the poultry thighs in the equipment and permitting the equipment to perform its deboning function while the worker waits for the deboning cycle to be completed. The hand/eye coordination of the worker must be timed with the operation of the equipment so that the worker does not have the flexibility to work slightly faster or slower during each cycle of operation of equipment.

SUMMARY OF THE INVENTION

Briefly described, the present invention comprises a deboning process and apparatus that comprises a plurality of deboning modules mounted on a revolving support system whereby poultry thighs and similar bone and muscle parts can be placed in sequence in modules of the apparatus at a worker's station, and as the apparatus revolves meat stripping functions are performed sequentially on each thigh.

Each module of the apparatus includes a rotary bone holder which carries the thigh bone with the module and the rotary bone holder rotates the bone about its own longitudinal axis. A pair of notched stripping blades engage the bone and move along the length of the bone as the bone is rotated so as to strip the meat from the bone. As the meat is being stripped from the bone a twisting action is imparted with respect to the meat and the bone. This bone twisting action tends to enhance the meat removal function of the system.

Therefore, it is an object of this invention to provide an improved meat deboning system and apparatus whereby poultry thighs and similar meat and bone animal/fowl products can be expediently and reliably deboned.

Another object of this invention is to provide a system and apparatus for deboning poultry thighs and the like which utilizes a revolving arrangement of modules each of which carries a poultry thigh through a series of processing stations as the thigh is deboned.

Another object of this invention is to provide an improved process and apparatus for deboning poultry thighs and the like which functions to rotate the bone with respect to the meat as the meat is stripped from the bone.

Others objects, features and advantages of the present invention will become apparent upon reading the following specification, when taken in conjunction with the accompanying drawings.

BRIEF DESCRIPTION OF THE DRAWINGS

FIG. 12 is a perspective illustration of the rotary bone holder, showing how the stripped bone is removed from the holder.

DETAILED DESCRIPTION

Figure 1:
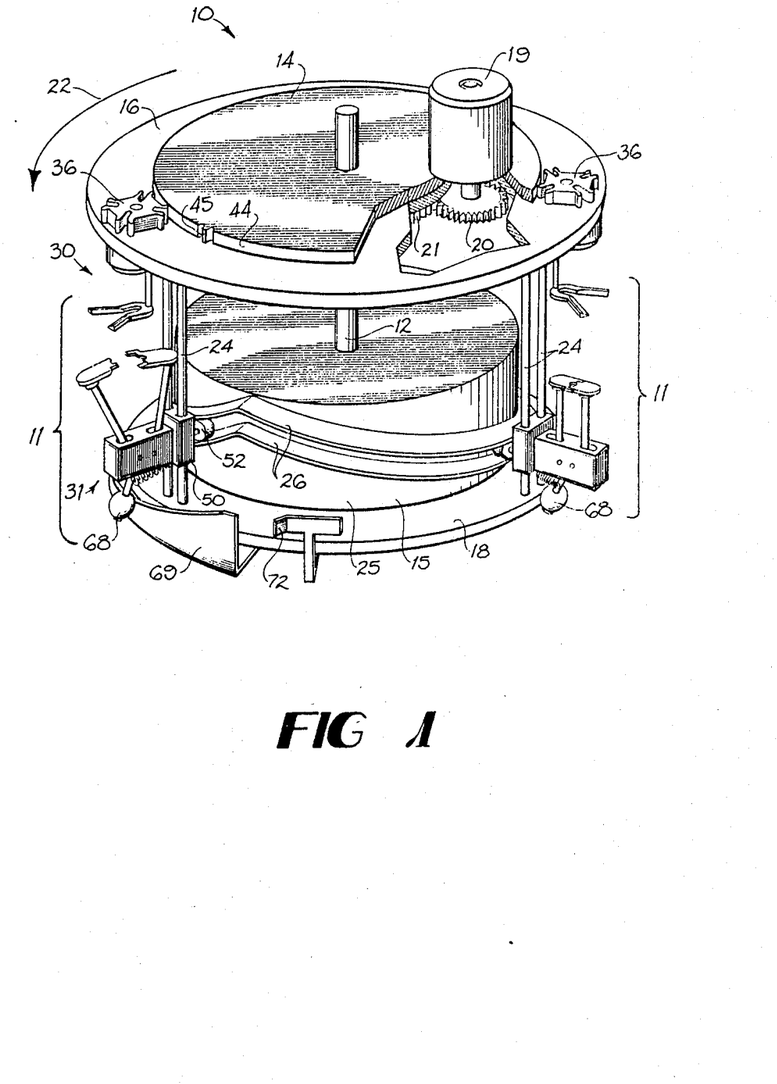
FIG. 1 is a perspective illustration of a first embodiment of the revolving deboner, showing only two modules mounted thereon for clarity.

Referring now in more detail to the drawings, in which like numerals indicate like parts throughout the several views, FIG. 1 illustrates the revolving poultry thigh deboner 10 in perspective, with only two deboning modules illustrated on the apparatus, with the other deboning modules being removed for clarity. It will be understood that a plurality of deboning modules 11 are positioned at equally spaced positions about the perimeter of the revolving poultry thigh deboner 10, and a plurality of work stations are also positioned about the revolving poultry thigh deboner. The work stations are not illustrated in FIG. 1 for clarity.

The thigh deboner 10 includes an upright stationary support shaft 12, with an upper platform 14 and cam drum 15 being rigidly mounted to the support shaft. Upper and lower rotary platforms 16 and 18 are mounted on bearings (not shown) to vertical support shaft 12. A motor 19 is mounted on upper stationary platform 14 and its driving sprocket 20 protrudes down through upper stationary platform 14 into driving engagement with the driven gear 21 which is rigidly mounted to upper rotary platform 16. This causes upper rotary platform 16 to rotate in the direction indicated by arrow 22.

Upper and lower rotary platforms 16 and 18 are connected together by a plurality of pairs of vertical guide bars 24. The connection of the upper and lower rotary platforms 16 and 18 by the pairs of vertical guide bars 24 causes the lower rotary platform to rotate in unison with the upper rotary platform.

Cam drum 15 has a cylindrical outer wall 25, and a spiral cam track 26 is formed on the cylindrical outer wall.

Each deboning module 11 includes a rotary bone holder 30 which is supported by upper rotary platform 16 and a stripper assembly 31 which is mounted for vertical movement on a pair of vertical guide bars 24.

Figure 2:
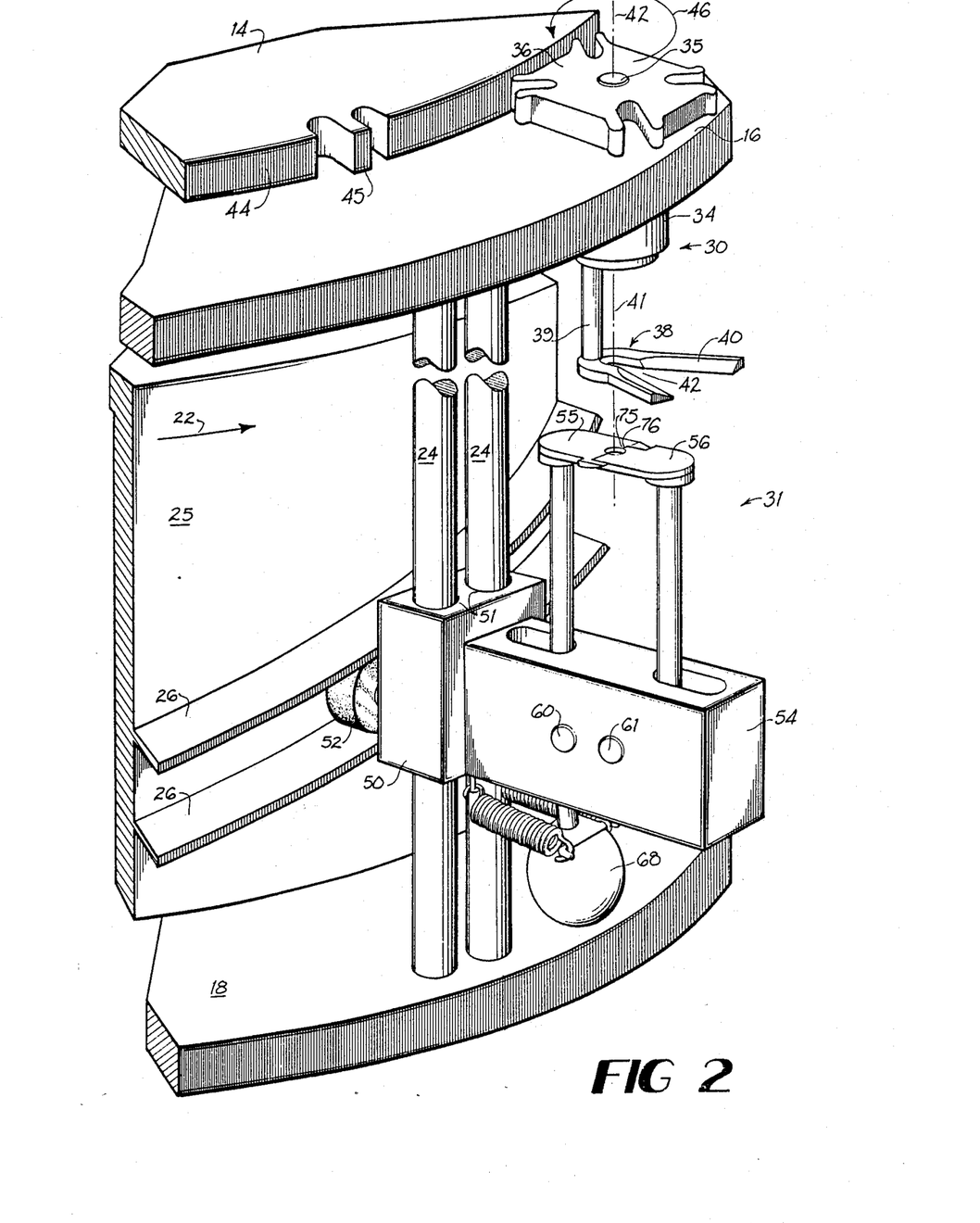
FIG. 2 illustrates one of the modules of the deboner.

As illustrated in FIG. 2, the rotary bone holder 30 comprises cylindrical support block 34 mounted just below upper rotary platform 16, vertical axle 35 that is rigidly mounted at its lower end to the support block 34 and which extends upwardly through an opening (not shown) in the upper rotary platform 16, turning sprocket 36 mounted to the upper end of vertical axle 35, and bone carrier 38 mounted to the lower portion of cylindrical support block 34. Bone carrier 38 includes an upright stem 39 and a bifurcated, approximately U-shaped bone receiving yoke 40. Stem 39 is laterally off-set from the vertical axis 41 of vertical axle 35, so that the vertical axis passes through the gap 42 of the yoke 40.

The perimeter 44 of upper stationary platform 14 is circular, and a plurality of sprocket turning protrusions 45 are mounted to the perimeter 44. The protrusions 45 are engaged by the turning sprockets 36 of each rotary bone holder 30 as the deboning modules 11 revolve about thigh deboner 10 in the direction as indicated by arrow 22. When a turning sprocket 36 moves into engagement with a sprocket turning protrusion 45, the protrusion causes the turning sprocket to rotate 90°. This results in the entire rotary bone holder 30 rotating 90° as indicated by arrow 46.

As illustrated in FIG. 2, each stripper assembly 31 is carried by a pair of vertical guide bars 24 and comprises a carrier block 50 that has a pair of vertical openings 51 that are mounted about the vertical guide bars 24. A cam roller 52 is rotatably mounted to carrier block 50 and is received in spiral cam track 26 of cam drum 25. Thus, as the stripper assembly 31 revolves about the cam drum 25, the cam roller 52 follows the cam track 26 to raise and lower the stripper assembly.

Figure 3:
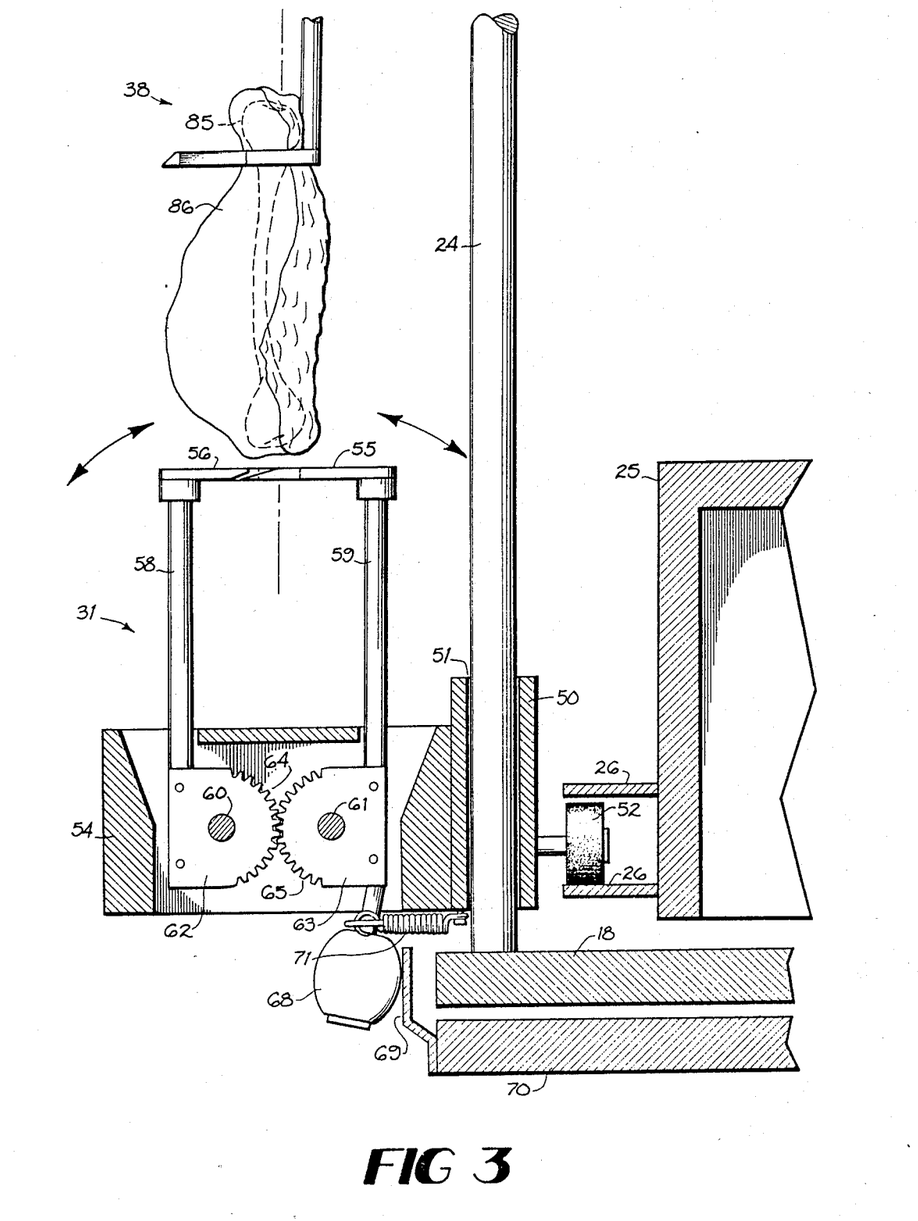
FIG. 3 illustrates the rotary bone holder having a poultry thigh mounted therein, with the rotary bone holder mounted above the stripper assembly, with the stripper block shown in cross section.

As illustrated in FIGS. 2 and 3, stripper block 54 is rigidly mounted to and carried by carrier block 50, and stripper blades 55 and 56 are movably supported by stripper block 54. Blade support arms 58 and 59 each are rigidly mounted at their upper ends to a stripper blade 55 or 56, and each blade support arm is mounted to a half gear 62, 63 and each half gear is pivoted about a pivot pin 60, 61, with the pivot pins 60, 61 being mounted interiorally of stripper block 54. The half gears 62, 63 have teeth 64, 65 which engage the opposite half gear 62, 63. With this arrangement when a stripper blade 55 or 56 pivots away from the opposite stripper blade about its horizontal axle 60 or 61, its half gear 62 or 63 will tilt the opposite half gears and its stripper blade in the opposite direction. Likewise, when a stripper blade moves back toward engagement with the opposite stripper blade, the gear quadrants cause corresponding movement of the opposing stripper blade.

As illustrated in FIG. 3, cam follower 68 is mounted to the lower protruding portion of stripper blade support arm 59. A cam surface 69 is mounted to a stationary support 70, and cam follower 68 engages the cam surface 69 as the stripper assembly 31 revolves about the thigh deboner.

Stripper block 54 is interiorally shaped so as to receive blade support arms 58 and 59, horizontal axles 60 and 61 and half gears 62 and 63, with enough space being formed within the stripper block to accommodate the tilting movements of the internal elements. A spring, such as coil tension spring 71, is connected at its ends to carrier block 50 and the lower end of blade support arm 59 to urge the stripper blades 55 and 56 toward engagement with each other.

Figure 7:
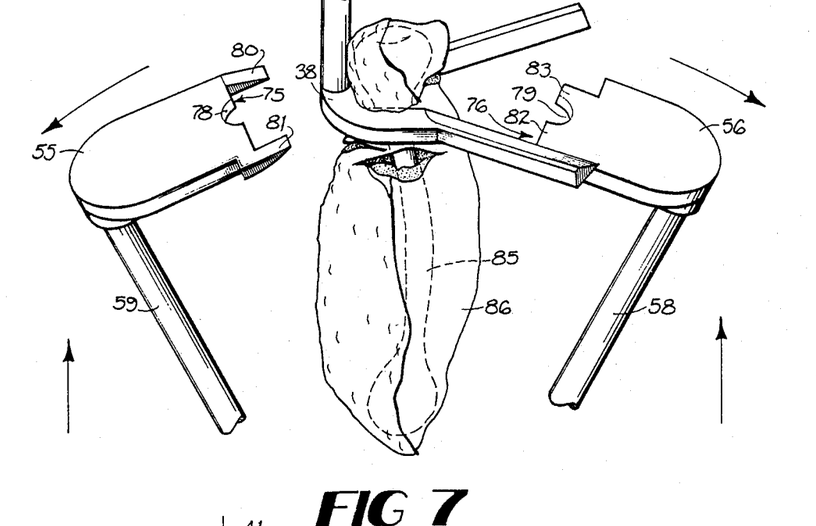
FIG. 7 is a perspective illustration of the rotary bone holder the stripper blades showing how the stripper blades move apart as they move up for engagement with the poultry thigh.

As illustrated in FIGS. 2 and 7, the stripper blades 55 and 56 have complex entry shaped facing edges 75 and 76. Stripper blade 55 includes a central half opening or recess 78 while stripper blade 56 includes a similar half opening or recess 79 which, when moved together, form a circular opening. Outer protrusions 80 and 81 of stripper blade 55 fit about inner protrusions 82 and 83 of stripper blade 56 when the blades move together. This tends to lock the blades in a precise fit when they move together about a bone 85 of a poultry thigh 86 (FIG. 8), with the blades 55 and 56 being locked together above most of the meat 87 of the poultry thigh.

Figure 4:
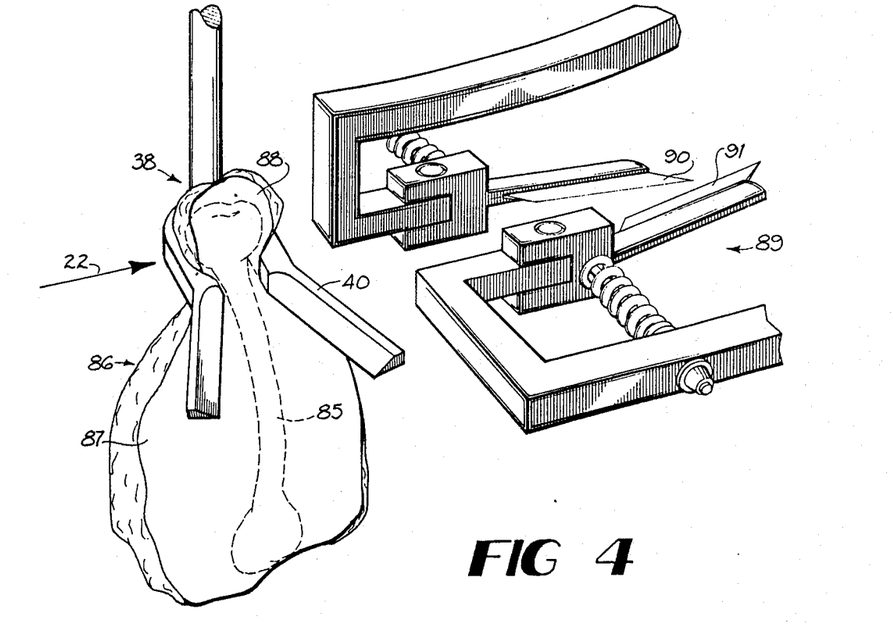
FIG. 4 a perspective illustration of the rotary bone holder and a poultry thigh mounted therein as the poultry thigh is carried through the first cutting station.
Figure 5:
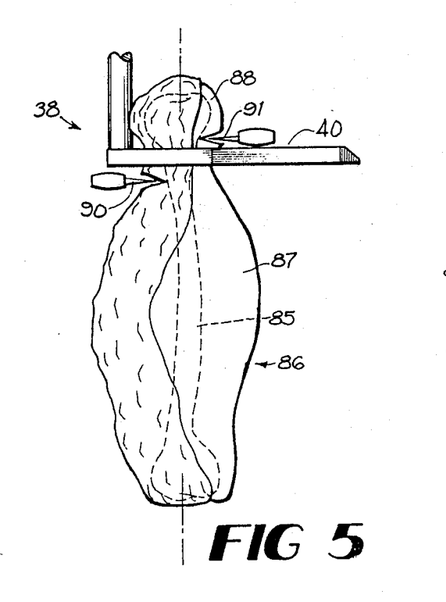
FIG. 5 is a side elevational view of the rotary bone holder, showing a poultry thigh mounted therein, and showing the cutting blades of FIG. 4 in engagement with the thigh.
Figure 6:
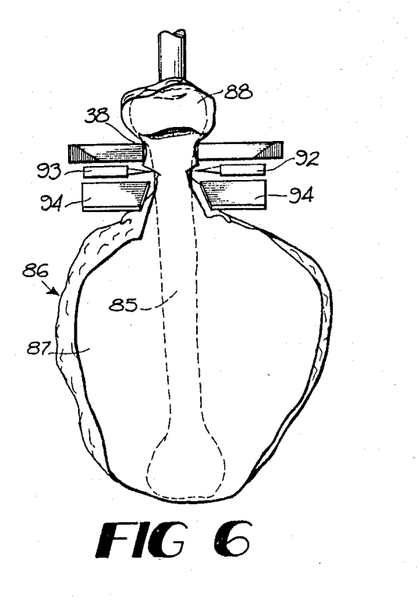
FIG. 6 is a front elevational view of the rotary bone holder and a second set of cutting blades, showing how the poultry thigh is carried by the rotary bone holder through the second set of cutting blades.

As illustrated in FIGS. 4, 5 and 6, a cutting station 89 is positioned in the path of travel of the bone carrier 38 as the bone carrier moves a thigh 86 in the direction as indicated by arrow 22. Cutting station 89 includes a pair of cutting blades 90 and 91 that are spring urged toward the path of the poultry thigh 86. As illustrated in FIG. 5, cutting blade 91 is located at an elevation just above the bone receiving yoke 40 of the bone carrier 38, whereas the cutting blade 90 is located just below the bone receiving yoke 40. With this arrangement, cutting blades 90 and 91 cut through the meat 87 and muscles of the poultry thigh 86 just below the upper knuckle 88 of the thigh bone 85.

As shown in FIG. 6, a second set of similar cutting blades 92 and 93 are positioned just beyond cutting blades 90 and 91 in the path of the poultry thigh 86, and blades 92 and 93 cut just below the bone carrier 38. It will be noted that bone carrier 38 and the poultry thigh 86 have been rotated 90° when moved from the position of FIG. 4 to the position of FIG. 5, so that the cutting blades 92 and 93 cut in the areas of the meat and muscles adjacent the upper end of the bone of the poultry thigh that was not previously cut by blades 90 and 91.

Positioned just below and extending beyond cutting blades 92 and 93 is a pair of strips 94 which are inclined downwardly for a short distance in the direction of travel of the thigh 86 and which tend to push the meat downwardly away from the upper knuckle 88 of the thigh bone 85 and make a space for the stripper blades 55 and 56 to reach the bone 85.

Figure 14:
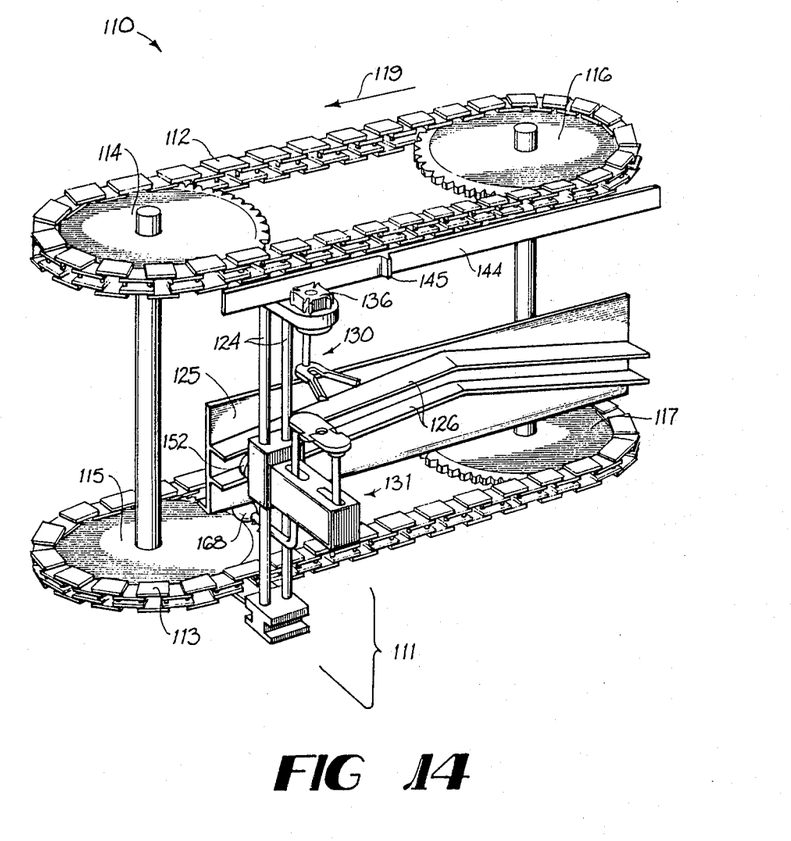
FIG. 14 is a perspective illustration of a second embodiment of the revolving deboner, showing only two modules.
Figure 15:
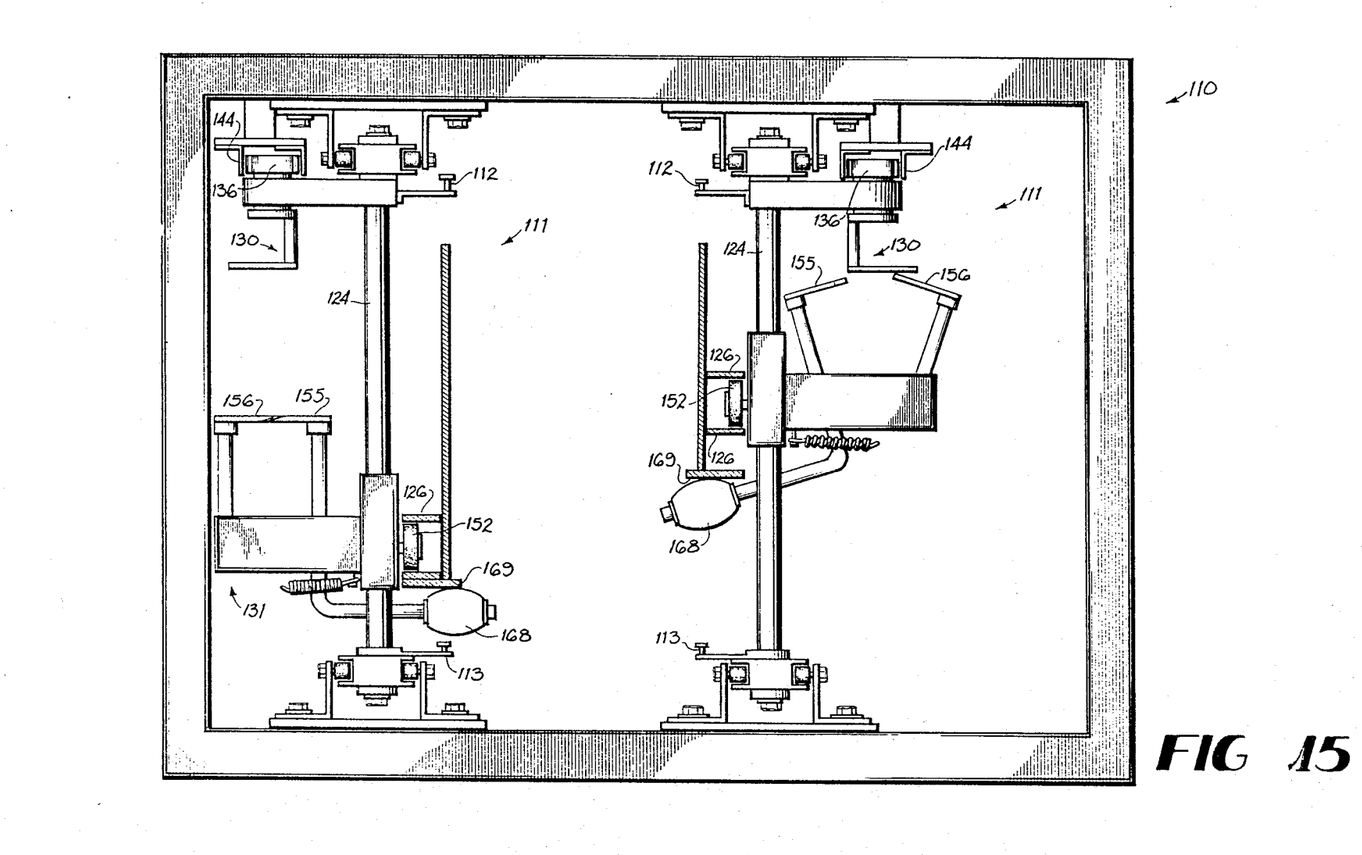
FIG. 15 is an end elevational view of a pair of modules of the second embodiment of the revolving deboner.

FIGS. 14 and 15 show a second embodiment of the invention. While FIGS. 1–13 disclose a carousel type revolving poultry thigh deboner, FIGS. 14 and 15 show a chain conveyor revolving deboner 110. The modules 111 are each mounted to upper and lower conveyor chains 112 and 113, with the conveyor chains extending about upper and lower sprockets 114 and 115 at one end of the system, and about upper and lower sprockets 116 and 117 at the other end of the system. One pair of the sprockets 114, 115 or 116, 117 is driven so as to move chains 112 and 113 about the sprockets in the direction as indicated by arrow 119. The pairs of vertical guide bars 124 of each module 111 are mounted at their tops and bottoms to links of the chains 112 and 113, and the rotary bone holder 130 of each module 111 is carried adjacent the upper chain 112. A cam track 126 is mounted to a support wall 125 that extends adjacent the path of travel of each module 111, so that the cam roller 152 of each module rides in the cam track 126, resulting in the cam track 126 raising and lowering each stripper assembly 131 in sequence as the module revolves about the deboner 110. Cam surfaces 169 are supported beneath cam track 126 on the support wall or other supporting structure so as to actuate the cam followers 168 of each module 111, so as to spread apart and bring together the stripper blades 155 and 156.

Turning sprockets 136 of each rotary bone holder 130 slidingly engage the outer surface of stationary guide 144, and when a sprocket 136 engages a sprocket turning protrusion 145 of the guide 144, the sprocket 136 and the remaining elements of the bone holder 130 turn 90 degrees, as previously described.

A plurality of work stations are located about the revolving deboner of FIGS. 14 and 15 as generally disclosed for the embodiment of FIGS. 1–13.

In general, except for the fact that the modules 111 of the embodiment of FIGS. 14 and 15 are carried by chains and revolve in an elongated closed path while the modules 11 of FIGS. 1–13 revolve in a circular path, the principles of operation of the second embodiment of FIGS. 14 and 15 are substantially the same as those of FIGS. 1–13. Thus, further detailed description of FIGS. 14 and 15 is not believed to be necessary.

OPERATION

When the revolving poultry thigh deboner 10 (FIG. 1) is in operation, its motor 19 causes the upper and lower rotary platforms 16 and 18 to rotate in the direction as indicated by arrow 22. A worker (not shown) retrieves poultry thighs from a supply and places each poultry thigh in a bone carrier 38 of a rotary bone holder 30 of each revolving deboning module 11, by inserting the upper portion of the bone into the gap 42 of the bone receiving yoke 40, with the yoke supporting the upper knuckle 88. Thus, each poultry thigh as firmly supported in and suspended beneath the bone carrier 38.

As the poultry thigh deboner 10 revolves about its centrally positioned vertical support shaft 12, each poultry thigh 86 is moved through the cutting station 89 where the cutting blades 90 and 91 engage and cut through the meat of each thigh adjacent the upper knuckle 88. As the poultry thigh 86 is carried beyond cutting blades 90 and 91, the turning sprocket 36 of the rotary bone holder 30 engages one of the sprocket turning protrusions 45 (FIG. 2) which causes the rotary bone holder 30 to rotate about its upright axis 41 (FIG. 2) as indicated by arrow 46, so that the bone receiving yoke 40 and the poultry thigh 86 are turned 90°. The poultry thigh is carried in this position until it is moved between cutting blades 92 and 93 (FIG. 6), so that the blades cut the meat 87 of the thigh just beneath the upper knuckle 88.

Stripper assembly 31 is then carried in an upward direction by its cam roller 52 following the cam track 26, and as the stripper blades 55 and 56 move upwardly to the thigh 86, the blades are moved apart by the action of the cam follower 68 engaging the cam surface 69, so that the blades are spread apart from each other (FIG. 7). When the stripper blades 55 and 56 have moved upwardly about the thigh and reach the level of just below bone carrier 38, the cam 69 allows the blades 55 and 56 to move back together under the influence of the tension spring 71, so that the stripper blades engage opposite sides of the poultry thigh 86 (FIG. 8), with the recesses 78 and 79 of the stripper blades surrounding the poultry bone 85.

Figure 8:
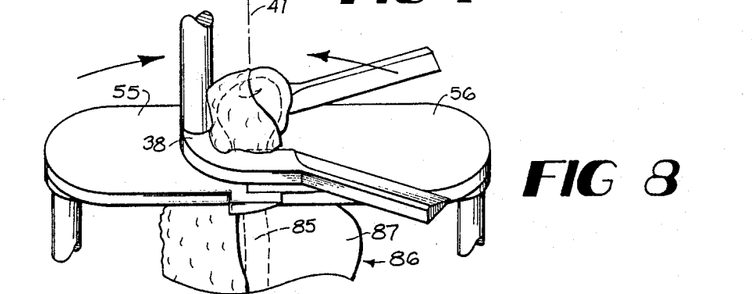
FIG. 8 is a perspective illustration, similar to FIG. 7, but showing how the stripper blades move into engagement with the poultry thigh.

Second cam 72 is located in the path of the cam follower 68 and engages the cam follower 68 so as to urge the stripper blades toward their closed positions, to assure that the stripper blades initially surround the upper end portion of the bone 85 of the poultry thigh 86.

Figure 9:
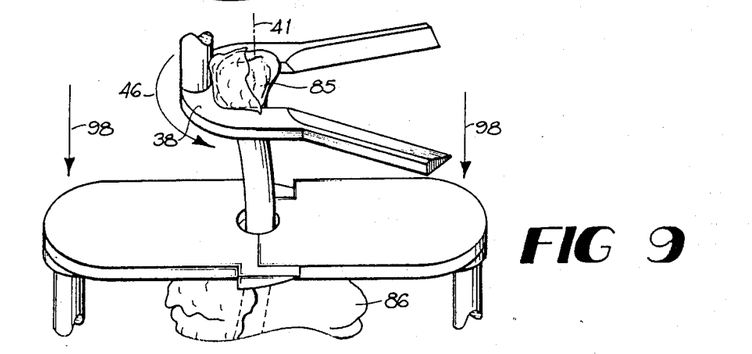
FIGS. 9-12 are perspective illustrations of the rotary bone holder and the stripper blades, showing the progressive movement of the stripper blades down the bone of the poultry thigh and how the meat is scraped from the thigh as the bone is rotated.
Figure 10:
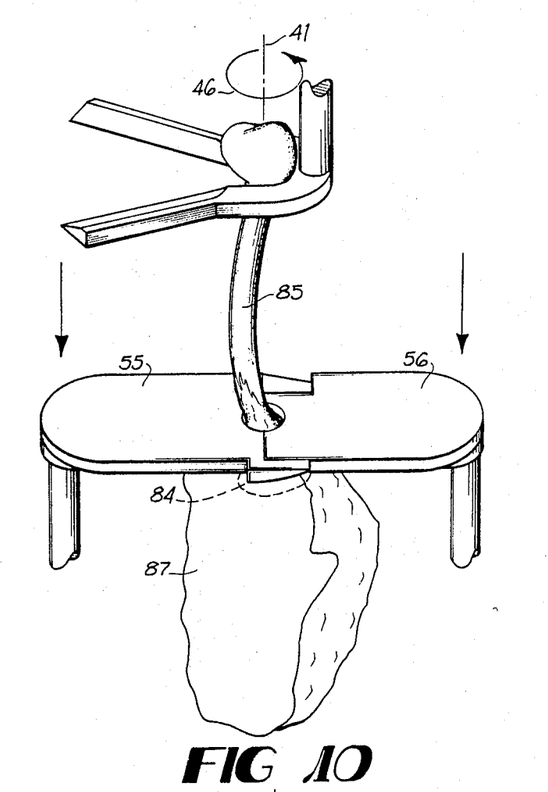
Figure 11:
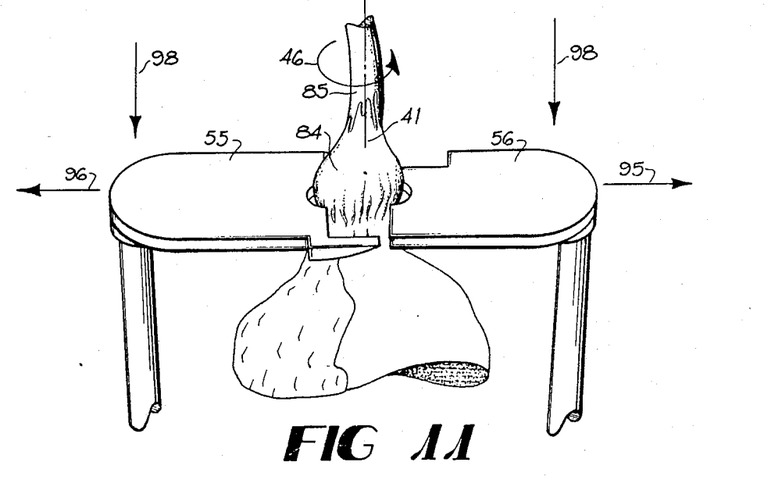
Figure 12:
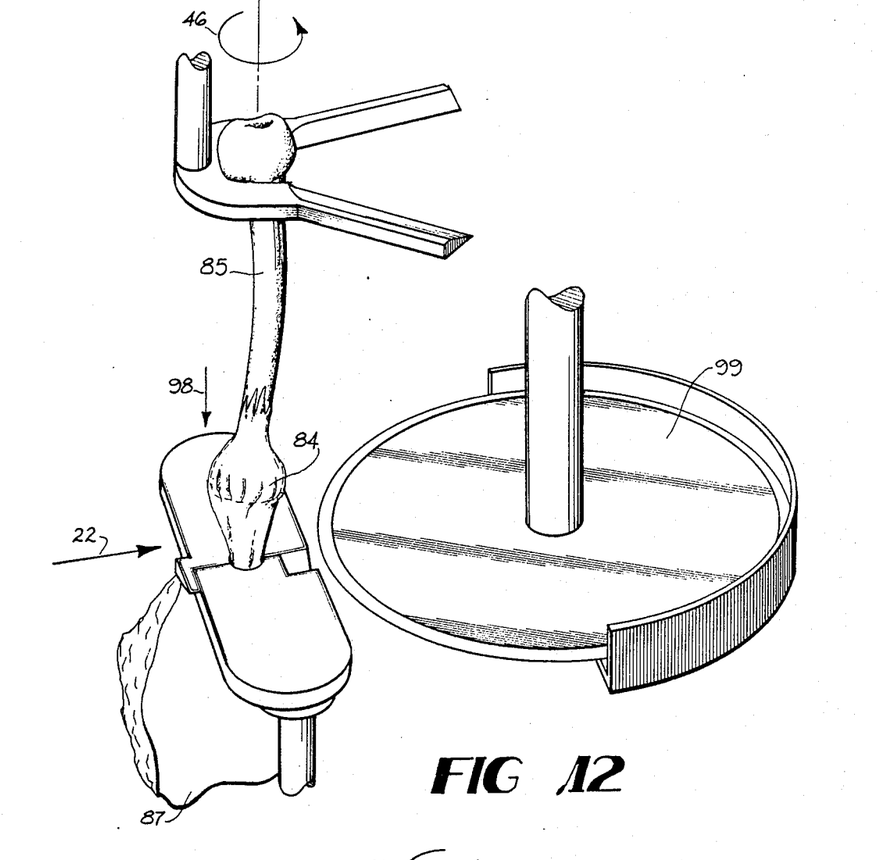
Figure 13:
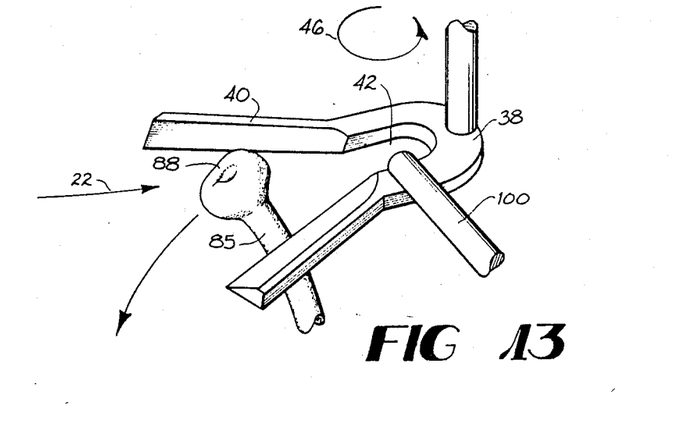

As the deboning module continues its movement about the cam drum 15, the rotary bone holder 30 engages a series of sprocket turning protrusions 45 (FIG. 2), so that the rotary bone holder 30 rotates about its upright turning axis 41 as indicated by arrow 46 (FIG. 9). In the meantime, stripper assembly 31 begins its downward movement under the influence of cam track 26 with the blades engaged about the thigh bone 85. The downward movement of the stripper blades 55 and 56 and the twisting of the thigh bone 85 about its longitudinal axis causes the meat 87 to be stripped from the bone 85 by pushing the meat along the length of the bone and rotating the bone with respect to the meat.

As the stripper blades 55 and 56 engage the lower knuckle 84 which is of larger diameter than the intermediate portion of the thigh bone 85 (FIGS. 11, 12 and 13), the spring 71 (FIG. 3) permits the stripping blades 55 and 56 to move away from each other as indicated by arrows 95 and 96, and then back toward each other (FIG. 13) so that the downward movement of the stripping blades as indicated by arrows 98 is not impeded.

Once the stripping blades 55 and 56 have moved about the lower knuckle 84 of the thigh bone 85, the meat 87 of the thigh will have been substantially stripped from the thigh bone. A rotary disc cutting blade 99 is positioned in the path 22 of the poultry thigh at a level just beneath the lower knuckle 84 of the bone 85 and cuts any portion of the meat 87 that remains clinging to the bone 85. This completely separates the meat from the bone of the poultry thigh. The meat 87 is permitted to drop to an awaiting collector, such as a surface conveyor, where the meat is transported away from the revolving poultry thigh deboner.

When the meat has been separated from the bone (FIG. 12), the bone 85 remains in the bone carrier 38. The bone carrier is rotated (FIG. 13) so that its gap 42 faces away from its direction of revolution 22, and the bone carrier 38 passes adjacent a stationary bone engagement rod 100, with the distal end of the rod 100 extending in the path of the bone 85. This causes the bone 85 to be knocked out of the gap 42 of the bone receiving yoke 40. The bones 85 are collected and transported away from the revolving poultry thigh deboner.

The bones of poultry thighs are curved, and the thighs are supported with their bones 85 in a substantially upright attitude. The bones are each rotated about their length as the stripper blades 55 and 56 engage the poultry thigh and move down the length of the bone. This combined scraping and turning action about the bone tends to efficiently remove the meat from the bone even though the bone is curved.

The operation of the second embodiment of the invention is similar to the operation of the previously described first embodiment, in that the modules 111 revolve with the movement of chains 112 and 113 in an elongated closed path past a plurality of work stations and the bone of the thigh is rotated as the meat is removed from the bone. An advantage of the embodiment of the deboner disclosed in FIGS. 14 and 15 is that the equipment can be moved through smaller doorways of a poultry processing plant and down the aisles between other equipment so as to reach the location within the poultry processing plant where it is to be installed. Further, in some plant locations the space available for new equipment is sometimes long and narrow instead of equal dimensions as might be required for the deboner of FIGS. 1-13.

Although the invention has been disclosed as a system and apparatus for deboning poultry thighs, it will be understood that the invention will be useful in deboning other fowl and animal parts.

It will be understood that the foregoing relates only to a preferred embodiment of the present invention, and that numerous changes and modifications may be made therein without departing from the spirit and scope of the invention as set forth in the following claims.

I claim:

1. A method of deboning poultry thighs or the like comprising the steps of:
    grasping a thigh bone at a first knuckle,
    engaging the thigh adjacent the first knuckle with meat stripper means,
    moving the thigh bone and the meat stripper means with respect to each other along the length of the thigh bone until the meat stripper means passes over the other knuckle of the thigh bone and separates the meat from the bone, and
    as the thigh bone moves with respect to the meat stripper means, rotating the thigh bone about its length with respect to the stripper means.

2. The method of claim 1 and further including the step of
    moving the other knuckle of the thigh bone and the stripper means adjacent a meat cutting means after the stripper means has passed over the knuckle, and
    cutting with the cutting means any meat extending from the thigh bone toward the stripper means.

3. The method of claim 1 and wherein the step of grasping the thigh bone adjacent the first knuckle of the thigh bone comprises inserting the thigh bone into the opening of an approximately U-shaped thigh bone holder, and wherein the step of rotating the thigh bone comprises rotating the bone holder.

4. The method of claim 1 and wherein the step of engaging the thigh bone with meat stripper means comprises moving a pair of meat stripper blade members into engagement with the thigh on opposite sides of the thigh.

5. A method of deboning poultry thighs or the like meat/bone product with an elongated bone surrounded with meat comprising the steps of
    inserting a plurality of the meat/bone products each at a first one of its ends into a series of bone holders mounted on a revolving machine,
    revolving the machine so as to revolve the meat/bone product along a processing path, and as the meat/bone products are moved along the processing path,
    engaging each meat/bone product with meat stripper means adjacent the one end of the bone,
    moving each bone with respect to the meat stripper means longitudinally along the length of the bone until the meat stripper means reaches the other end of the bone and substantially removes the meat from the bone, and
    rotating each bone holder as the bone holders revolve about the machine so as to rotate each bone as the bone is moved longitudinally with respect to the meat stripper means.

6. The method of claim 5 and wherein the step of moving each bone longitudinally along its length with respect to the meat stripper means comprises moving the meat stripper means and the bone holders toward and away from each other.

7. A process of removing meat from an elongated bone of a fowl or the like, comprising the steps of:
    mounting one end of the bone with meat attached thereto within a carrier with a majority of the bone and its meat protruding from the carrier;
    moving the carrier with the bone and its meat protruding from the carrier along a processing path;
    as the bone and its meat move with the carrier along the processing path engaging the bone at a position adjacent the carrier with a stripper means;
    moving the stripper means along the length of the bone in response to the movement of the carrier along the processing path; and
    turning the bone about its length as the stripper means move away from the carrier and along the length of the bone to remove the meat from the bone.

8. A process of removing meat from an elongated bone of poultry or the like comprising the steps of:
    mounting one end of the bone having meat attached thereon on a carrier with a majority of the bone and the meat thereon protruding from the carrier;
    revolving the carrier so as to move the bone and its meat along a processing path;
    engaging the bone with a stripper means at a position adjacent to the carrier as the bone and its meat move with the carrier along the processing path;
    moving the stripper means away from the carrier and along the length of the bone in response to the carrier movement along the processing path to strip the meat from the bone; and
    turning the bone and the stripper means with respect to each other as the stripper means move away from the carrier and along the length of the bone.

9. The process of claim 8 and wherein the step of moving the stripper means along the length of the bone comprises moving the stripper means beyond the end of the bone to separate the meat from the bone and further including the step of cutting any meat clinging from the separated meat to the bone.

10. The process of claim 8 and wherein the step of moving the carrier along a processing path comprises moving the stripper means in unison with the carrier along the processing path and wherein the step of moving the stripper means away from the carrier comprises moving the stripper means toward and away from the carrier in response to the movement of the carrier along the processing path.

11. The process of claim 8 and further including the step of cutting the meat at the one end of the bone adjacent the carrier.

12. Apparatus for removing the meat from an elongated bone of a poultry part or the like comprising
 a support system,
 power means for revolving said support system,
 a plurality of deboning modules carried in series about said support system,
 said modules each including a bone carrier and meat stripper means,
 said bone carriers each including means for supporting the bone of the poultry part at one end of the bone and with the majority of the bone and meat protruding from the carrier,
 said meat stripper means each including stripper blades movable between open positions displaced from the poultry part and closed positions biased into engagement with opposite sides of the bone of the poultry part,
 first cam means for moving said stripper means toward and away from said bone carrier in response to the deboning module revolving about said support system,
 second cam means for moving said stripper blades between their open and closed positions in response to the deboning module revolting about said support system, and
 means for turning the bone about its length as said stripper means moves away from said carrier.

13. Apparatus for removing meat from an elongated bone of a poultry part or the like comprising:
 a movable support frame,
 a bone carrier mounted on said support frame for holding a poultry part,
 stripper means mounted on said support frame and positioned adjacent said carrier,
 power means for moving said support frame and carrying said bone carrier and said stripper means along a processing path,
 first cam means for moving said stripper means toward and away from said bone carrier in response to the movement of said stripper means along the processing path,
 second cam means for moving said stripper means toward and away from engagement with the poultry part held by said carrier and for maintaining said stripper means in engagement with the poultry part as said stripper means moves away from said bone carrier in response to the movement of said stripper means along the processing path, and
 means for turning the bone about its length as the stripper means engages the poultry part.

14. In an apparatus for removing meat from an elongated bone of a poultry part or the like comprising:
 a bone holder for supporting one end of a bone of a poultry part,
 stripper means for engaging and substantially surrounding the poultry part held by the bone holder,
 means for moving said stripper means and said bone holder toward and away from each other so that the stripper means moves along the length of the bone to push the meat off the bone as the stripper means engages the poultry part, and
 means for rotating said bone holder as said stripping means moves away from said bone holder so as to rotate the bone with respect to the meat as the meat is pushed from the bone.

15. The apparatus of claim 14 and further including cutting means arranged to cut the meat and the muscles of the poultry part supported by said bone holder.

16. The apparatus of claim 14 and further including means for moving said bone holder and said stripper means along a processing path as said bone holder is rotated.

* * * * *